US010619752B2

(12) United States Patent
    Cederschiöld

(10) Patent No.: US 10,619,752 B2
(45) Date of Patent: Apr. 14, 2020

(54) PRESSURE EQUALIZING DEVICE AND RECEPTACLE

(71) Applicant: Becton Dickinson and Company Limited, Dun Laoghaire (IE)

(72) Inventor: Alexander Cederschiöld, Gothenburg (SE)

(73) Assignee: Becton Dickinson and Company Limited, Dun Laoghaire (IE)

(*) Notice: Subject to any disclaimer, the term of this patent is extended or adjusted under 35 U.S.C. 154(b) by 191 days.

(21) Appl. No.: 15/787,045

(22) Filed: Oct. 18, 2017

(65) Prior Publication Data

US 2018/0058594 A1 Mar. 1, 2018

Related U.S. Application Data

(63) Continuation of application No. 13/782,439, filed on Mar. 1, 2013, now Pat. No. 9,822,891.

(60) Provisional application No. 61/605,433, filed on Mar. 1, 2012.

(51) Int. Cl.
    *F16K 17/00* (2006.01)
    *A61J 1/20* (2006.01)

(52) U.S. Cl.
    CPC ............... *F16K 17/00* (2013.01); *A61J 1/20* (2013.01); *A61J 1/2096* (2013.01); *A61J 1/201* (2015.05); *A61J 1/2055* (2015.05); *A61J 1/2072* (2015.05); *Y10T 137/7784* (2015.04)

(58) Field of Classification Search
    CPC .. F16K 17/00; A61J 1/20; A61J 1/2096; A61J 1/201; A61J 1/2055; A61J 1/2072; Y10T 137/7784

USPC .......................................................... 141/319
See application file for complete search history.

(56) References Cited

U.S. PATENT DOCUMENTS

| 4,457,749 A * | 7/1984 | Bellotti ............... A61M 39/221 604/244 |
| 4,564,054 A | 1/1986 | Gustavsson |
| 4,673,404 A | 6/1987 | Gustavsson |
| 4,768,568 A | 9/1988 | Fournier et al. |

(Continued)

FOREIGN PATENT DOCUMENTS

| EP | 2036529 A1 | 3/2009 |
| FR | 2951638 A1 | 4/2011 |

(Continued)

*Primary Examiner* — Timothy L Maust
*Assistant Examiner* — James R Hakomaki
(74) *Attorney, Agent, or Firm* — The Webb Law Firm

(57) ABSTRACT

Provided is a pressure equalizing device for facilitating drug reconstitution in a closed system. The pressure equalizing device includes a container for attachment to a receptacle, to permit pressure equalization between the container and the receptacle. The container includes a first chamber and a second chamber. The device further includes a vent channel extending between the first chamber and a distal opening of the vent channel. In accordance with the invention, when the receptacle is connected to the pressure equalizing device, the vent channel establishes direct fluid communication between the first chamber and the receptacle. Additionally, a longitudinal axis of the pressure equalizing device is configured to be aligned with or parallel to a longitudinal axis of the receptacle when the pressure equalizing device is attached to the receptacle.

13 Claims, 6 Drawing Sheets

(56) References Cited

U.S. PATENT DOCUMENTS

| | | | |
|---|---|---|---|
| 4,932,937 A * | 6/1990 | Gustavsson | A61J 1/2089 206/219 |
| 5,122,117 A | 6/1992 | Haber et al. | |
| 5,176,673 A | 1/1993 | Marrucchi | |
| 5,456,678 A | 10/1995 | Nicoletti | |
| 5,514,090 A | 5/1996 | Kriesel et al. | |
| 5,772,079 A * | 6/1998 | Gueret | B65D 83/0055 222/321.7 |
| 6,159,193 A | 12/2000 | Turk | |
| 7,086,431 B2 | 8/2006 | D'Antonio et al. | |
| 7,261,105 B2 * | 8/2007 | Fukunaga | A61M 16/01 128/203.12 |
| 7,507,227 B2 | 3/2009 | Fangrow | |
| 7,743,799 B2 | 6/2010 | Mosler et al. | |
| 7,798,373 B1 * | 9/2010 | Wroblewski | B05B 11/00 222/209 |
| 7,900,659 B2 | 3/2011 | Whitley et al. | |
| 8,029,747 B2 | 10/2011 | Helmerson | |
| 8,317,741 B2 * | 11/2012 | Kraushaar | A61J 1/2096 604/158 |
| 9,662,272 B2 * | 5/2017 | Warren | A61J 1/2089 |
| 9,931,275 B2 * | 4/2018 | Fangrow | A61J 1/2096 |
| 2002/0177819 A1 | 11/2002 | Barker et al. | |
| 2002/0193777 A1 | 12/2002 | Aneas | |
| 2005/0150505 A1 * | 7/2005 | Burrow | A61M 16/0816 128/204.18 |
| 2006/0235364 A1 * | 10/2006 | O'Hare | A61J 1/2096 604/411 |
| 2010/0147402 A1 | 6/2010 | Tornqvist | |
| 2011/0168294 A1 | 7/2011 | Jakobsen et al. | |

FOREIGN PATENT DOCUMENTS

| | | |
|---|---|---|
| JP | 60501342 A | 8/1985 |
| JP | 2004511306 A | 4/2004 |
| JP | 2010512948 A | 4/2010 |
| JP | 2010124898 A | 6/2010 |
| JP | 2010528809 A | 8/2010 |
| WO | 2005041846 A2 | 5/2005 |
| WO | 2008129550 A2 | 10/2008 |
| WO | 2009140511 A1 | 11/2009 |
| WO | 2011141200 A1 | 11/2011 |
| WO | 2011150037 A1 | 12/2011 |
| WO | 2013072421 A1 | 5/2013 |

* cited by examiner

PRESSURE EQUALIZING DEVICE AND RECEPTACLE

CROSS REFERENCE

This application is a continuation of U.S. application Ser. No. 13/782,439 entitled "Pressure Equalizing Device and Receptacle", filed on Mar. 1, 2013, which claims the benefit of U.S. Provisional Patent Application No. 61/605,433 entitled "Pressure Equalizing Device and Receptacle" filed Mar. 1, 2012, each of which are hereby incorporated by reference in their entirety.

BACKGROUND OF THE INVENTION

Field of the Invention

This invention relates generally to devices for reconstitution of a first fluid with a second fluid and more particularly to a pressure equalizing device for attachment between a fluid container and a receptacle for equalizing pressure within the container and receptacle.

Background of the Related Art

Certain drugs or medicaments (those terms being used interchangeably herein) are preferably provided in powder or dry form (such as a lyophilized form), and require reconstitution prior to administration. Lyophilized drugs, for example, typically are supplied in a freeze-dried form that needs to be mixed with a diluent to reconstitute the substance into a form that is suitable for injection. Medicaments may also be provided in other dry or powder forms that require reconstitution.

In addition, drugs may be provided as multi-part systems which require mixing prior to administration. For example, one or more liquid (e.g., flowable (slurry or liquid)) components, and/or dry (e.g., powdered or granular) components may be provided in a drug container or delivery device which require mixing prior to administration. Gondatropin and interferon are examples of such multi-component substances which are typically mixed just prior to being administered to a patient.

Drug reconstitution generally involves transferring a solvent from one container to a sealed vial containing the drug in powder or liquid form, by means of a needle, syringe, or transfer set. In some circumstances, the reconstituted fluid may be inadvertently released into the atmosphere in gas form or by way of aerosolization, during the withdrawal of the needle from the vial and while the needle is inside the vial if any pressure differential between the interior of the vial and surrounding atmosphere exists.

Certain drugs, medicaments, and drug systems may become toxic when reconstituted creating a risk of contamination for practitioners, pharmaceutical personnel, and patients. When preparing and administering such toxic substances, care must be taken to avoid contamination. Safety boxes, cabinets, or isolators are often used to prepare drugs to reduce the risk that toxic substances will leak to the surrounding environment. However, such facilities are non-portable and, generally, require substantial space in a clinical setting. Such facilities are also expensive to install, maintain, and repair.

Alternatively, a closed pressure equalizing device may be attached between the vial and fluid container during reconstitution to reduce the risk that the reconstituted fluid will be inadvertently released. The pressure equalizing device comprises a gas container in communication with the interior of the vial, which ensures that neither an increased pressure nor a vacuum can occur inside the vial when gas or liquid is injected into or withdrawn from the vial. The gas container may be filled with cleaned or sterilized air prior to its use to ensure that the contents of the vial do not become contaminated with air-borne particles such as dust, pollen, mould, or bacteria and other undesirable substances. A closed pressure equalizing system for use in drug reconstitution is disclosed in U.S. Pat. No. 8,029,747, entitled "Pressure Equalizing Device, Receptacle and Method", the disclosure of which is incorporated herein by reference in its entirety.

A further pressure equalizing device is disclosed in U.S. Pat. No. 7,900,659, entitled "Pressure Equalizing Device for Vial Access" (hereinafter "the '659 patent"). The '659 patent discloses a vial access device having a pressure equalizing chamber delimited by a slideable disk. The disk automatically moves within the chamber to maintain the vial at atmospheric pressure during reconstitution and aspiration of the vial's contents. The device further includes a hydrophobic filter disposed in a port between the vial and pressure equalizing device for preventing fluid from entering the pressure equalizing chamber.

A disadvantage with such a pressure equalizing vial access device is that the filter may become clogged with solid particles, such as powder, carried agglomerates, or high viscose liquid from the fluid transferred between the pressure equalizing vial access device and the vial. The solid particles may hinder or prevent pressure equalization. The pressure equalizing vial access device also takes up valuable space around the vial opening since the longitudinal axis of the pressure equalizing chamber is arranged at a 90 degree angle relative to the longitudinal axis of the vial. Accordingly, it may be difficult to use the pressure equalization device in locations having limited space such as hospital rooms, laboratories, and other clinical settings. Furthermore, a vial having such a pressure equalizing vial access device attached is generally top-heavy and may topple over if the pressure equalizing vial access device is not supported by a user. The pressure equalizing device of the present invention is provided to address the above identified deficiencies.

SUMMARY OF THE INVENTION

According to one embodiment of the invention, a pressure equalizing device includes a container for attachment to a receptacle, to permit pressure equalization between the container and the receptacle. The container includes a first chamber and an second chamber. The device further includes a fluid transfer member defining a vent channel extending between the first chamber and a distal end of the needle. In accordance with the invention, when the receptacle is connected to the pressure equalizing device, the vent channel establishes direct fluid communication between the first chamber and the receptacle. Additionally, a longitudinal axis (A) of the pressure equalizing device is configured to be aligned with or parallel to a longitudinal axis (B) of the receptacle when the pressure equalizing device is attached to the receptacle.

According to a further embodiment of the invention, an assembly for reconstitution of a medical substance is provided. The assembly includes a fluid injector having a fluid reservoir and defining a longitudinal axis (C), a receptacle defining an interior volume and having a longitudinal axis (B), and a pressure equalizing device connected between the fluid injector and the receptacle having a longitudinal axis (A). The pressure equalizing device includes a container for attachment to the receptacle to permit pressure equalization between the container and the receptacle. The container includes a first chamber and a second chamber. The device further includes a fluid transfer member having an access channel, connected between the fluid injector and the inner volume of the receptacle, and a vent channel, connected between the inner volume of the receptacle and the first chamber. When the receptacle is connected to the pressure equalizing device, the vent channel establishes direct fluid communication between the first chamber and the receptacle. Furthermore, the longitudinal axis (A) of the pressure equalizing device, the longitudinal axis of the receptacle (B), and the longitudinal axis of the fluid injector (C) are aligned with or parallel to each other.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

DETAILED DESCRIPTION OF THE INVENTION

Figure 1:
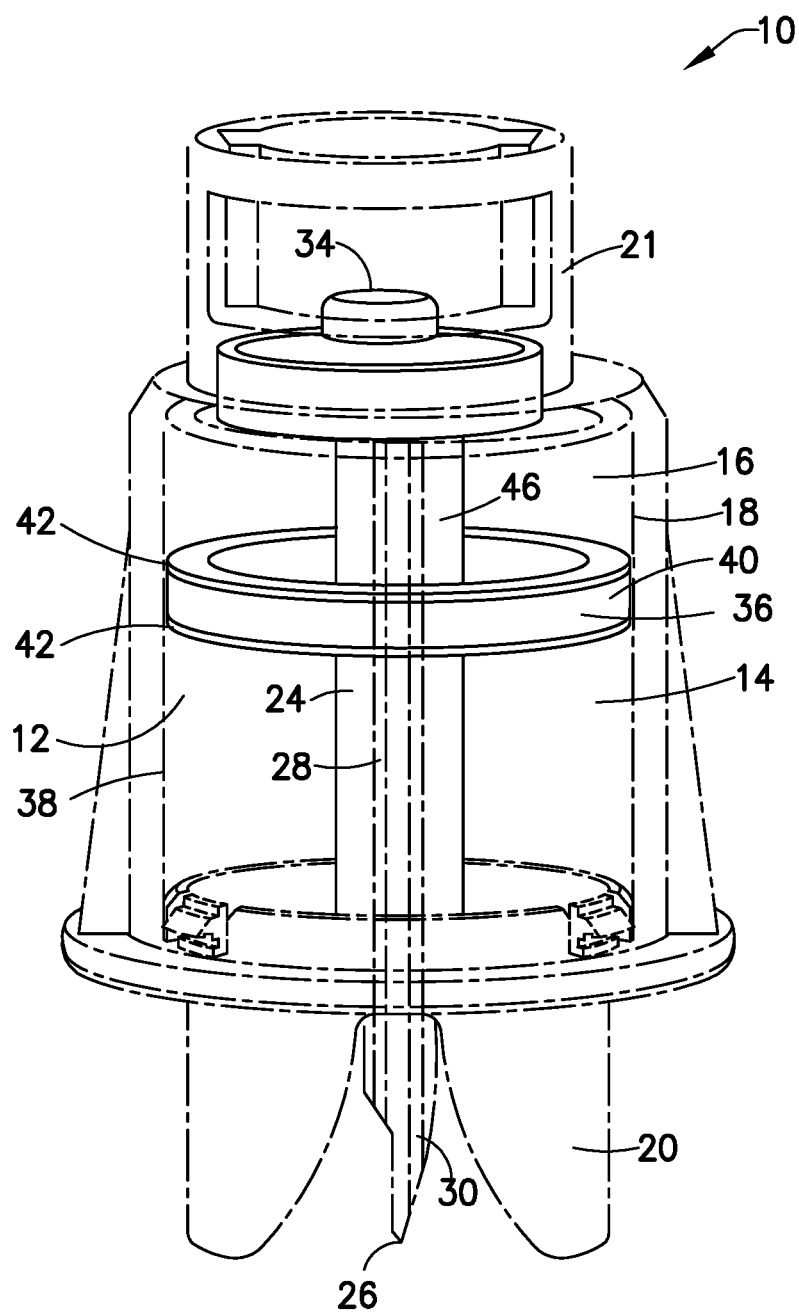
FIG. 1 is a perspective view of a pressure equalizing device with container and receptacle connector depicted in phantom, according to an embodiment of the present invention.

As used herein, spatial or directional terms, such as "up", "down", "above", "below", "top", "bottom", and the like, relate to the invention as it is shown in the drawing figures. However, it is to be understood that the invention can assume various alternative orientations and, accordingly, such terms are not to be considered as limiting.

The terms "cleaned" and "asceptic" fluid refer to fluids that have been filtered by a filter to remove particles and/or viable micro-organisms to such an extent that the fluid is classified as aseptic as defined by the relevant authorities and/or generally applicable standards. The degree of purity can be expressed in terms of the largest particles allowed to pass through the filter for a given flow rate of fluid. In some cases such a cleansed fluid will not have any particles or only a few particles exceeding 5 µm. However, the allowed particle size is determined by the requirements in the current application. For other drug treatments, substantially all particles having a size exceeding 0.15 µm are removed from the fluid by the particulate air filter.

The expression "sterilized" and/or "sterile" refer to fluids that have been subjected to a sterilization method to remove viable micro-organisms using methods approved by the relevant regulatory authority. For example, current European regulations for sterilization of medical devices are evaluated according to standard EN 556-1. Other regulations may exist in other countries. Exemplary sterilization methods include ethylene oxide sterilization, sterilization by irradiation, heat and/or moist heat sterilization, as well as other accepted methods as are known in the art. The European standard requirements require that the theoretical probability that a viable micro-organism is present on/in the sterilized device shall be equal to or less than $1 \times 10^{-6}$.

The expressions "flexible material", "expandable material", and "compressible material" as used in this document are defined as any material that is capable of being flexed, expanded, or compressed with an increase/decrease in volume in the fluid container respectively. "Flexible material" is intended to mean material that can easily be folded or twisted or bent by hand or material that may be flexed and/or bent repeatedly without rupture or the development of visible defects.

The expressions "rigid" and "non-compressible material", as used in this document, are intended to mean material that is incapable of being flexed, expanded, or compressed with an increase/decrease in volume in the fluid container respectively. Non-rigid plastic may be defined as plastic that has a modulus of elasticity in flexure, or if that is not applicable, then in tension, not greater than 70 MPa under the conditions, such as temperature and relative humidity conditions, specified in International Standard ISO 291.

"Stoppers" or closures for receptacles are defined by International Standards such as ISO 8362-5 and ISO 8536-2:2010.

One embodiment of the present invention is directed to devices and assemblies for pressure equalization for use with devices and systems for drug reconstitution. More specifically, the embodiment of the present invention provides a pressure equalizing device which can be used during reconstitution of a toxic substance to create a closed system, to reduce the possibility that patients, clinicians, practitioners, and other medical personnel will be exposed to the toxic substance.

Additionally, the pressure equalizing device, according to one embodiment, is configured to have a reduced total volume compared with previously known devices, to conserve space in and around the top portion of a medical receptacle. A pressure equalizing device configured with a reduced total volume is easier to attach to a medical receptacle. Furthermore, because the pressure equalizing device is generally smaller than known pressure equalizing devices, it is easier for a user to read receptacle labels and/or injector markings, and to view the contents of the receptacle, injector and/or the pressure equalizing device during use. Furthermore, certain embodiments of the pressure equalizing device may be easier to use in a table top vial reconstitution mixer (or "vial reconstitution shaker") that mixes the contents of a receptacle connected thereto. More particularly, as is described herein, the pressure equalizing device may include structures and configurations to prevent the receptacle from toppling over if it is left standing with the pressure equalizing device attached, and for preventing the device and/or receptacle from rolling along a flat or sloped surface when the device is left lying on its side.

With reference to FIGS. 1-7, a pressure equalizing device 10 according to an embodiment of the present invention is depicted. The pressure equalizing device 10 includes a container 12 defining an open chamber 14 and a sealed chamber 16. The open chamber 14 and sealed chamber 16 are not in fluid communication with one another. However, a thin coating 18 or film may be applied to an inner wall of the container 12 as a lubricant. The film 18 may be transferred between the respective chambers 14, 16 provided that no other fluid transfer occurs. The open chamber 14 is, optionally, in fluid communication with ambient air and at atmospheric pressure.

The device 10 further includes a connector 20 for attaching the device 10 to a receptacle 22. The receptacle 22 may be any medical container formed from any suitable sterile material, including vials, cartridges, test tubes, sample collection tubes, syringe barrels, and the like. The device 10 is configured to permit pressure equalization between the sealed chamber 16 and the receptacle 22. The receptacle 22 may be a standard medical vial having a volume of 3 ml, 5 ml, 13 ml, 16.7 ml, or any other suitable standard or customized volume. The maximum volume of the container 12 preferably corresponds to the volume of the receptacle 22. However, the container 12 may range in volume from about 1 $cm^3$ to about 1 litre, depending on the drug or substance being reconstituted. The receptacle 22 may contain a solid, liquid, or gaseous pharmaceutical, biological, or veterinary substance and may be sealed by means of a cap and/or an elastomeric stopper or membrane.

The pressure equalizing device 10 further includes a connector 21 for attaching the pressure equalizing device 10 to a fluid container 110, such as a syringe or injector. The connector 21 may be a luer-lock, bayonet, snap-fit mechanism, or other connection capable of establishing a removable connection between a cylindrical container and fluid access port The pressure equalizing device 10 further includes a fluid transfer member 24, such as a needle, needle cannula, lumen, channel, or spike, having a distal tip 26 and defining a venting channel 28. The venting channel 28 has a distal opening adjacent the distal tip 26 for insertion into the receptacle 22. The venting channel 28 extends between the receptacle 22 and the sealed chamber 16. The transfer member 24 further includes a fluid access channel 30 extending between an access port 32, at a proximal end of the fluid transfer member 24, and the distal tip 26.

The pressure equalizing device 10 further includes a pierceable membrane 34 inserted within or connected to the access port 32. The membrane 34 is configured to be resealably pierced by a needle or spike, thereby establishing fluid communication between the needle or spike and the access channel 30 through the membrane 34. In one non-limiting embodiment of the invention, the pressure equalizing device 10 also includes a second membrane (not shown) located at the distal end of the fluid transfer member 24 which is arranged to be pressed against the cap or sealing means of a receptacle 22.

Figure 7:
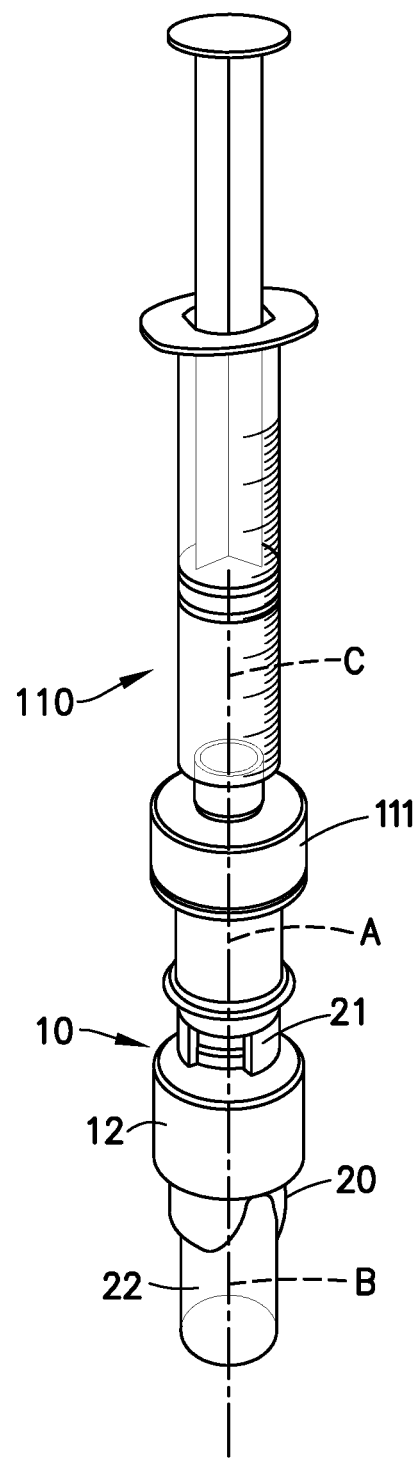
FIG. 7 is a perspective view of an assembly for reconstitution of a medicament or drug, according to an embodiment of the present invention.

As is shown in FIG. 7, the pressure equalizing device 10 has a longitudinal axis A. When the equalizing device 10 is attached to the receptacle 22, the longitudinal axis A is arranged in alignment and/or parallel with a longitudinal axis B of the receptacle 22. Furthermore, the fluid transfer member 24 and venting channel 28 are arranged along the longitudinal axis A of the pressure equalizing device 10.

As fluid is injected into the receptacle 22 or withdrawn therefrom, the venting channel 28 of the pressure equalizing device 10 permits gas to flow from the interior of the receptacle 22 into the sealed chamber 16 or from the sealed chamber 16 to the receptacle 22, thereby equalizing the pressure in the interior of the receptacle 22 and in the sealed chamber 16. Fluid cannot exit the sealed chamber 16, which eliminates, or at least reduces, the risk of any substance inside the receptacle 22 being released into the atmosphere in gas form or by way of aerosolization during the insertion or withdrawal of the fluid transfer member 24 from the receptacle 22. Use of a pressure equalizing device 10 also reduces the risk that pressure in the receptacle 22 will increase. Increased pressure in the receptacle 22 may cause the receptacle 22 to leak or deform, further increasing the risk of contamination of the reconstituted fluid.

With continued reference to FIGS. 1-7 and in one non-limiting embodiment, the open chamber 14 is delimited by a moveable wall 36 and rigid walls 38 of the container 12. The open chamber 14 is located between a lower surface of the moveable wall 36 and the receptacle 22. The moveable wall 36 may function as a piston which is moveable within the container 12 to equalize pressure within the receptacle 22 and sealed chamber 16. The moveable wall 36 is freely moveable in that it will automatically transition between a first position, in which the wall 36 is adjacent to the proximal end of the container 12, and a second position in which the wall is adjacent to the distal end of the container 12. The wall 36 is automatically moveable, in that it transitions from one position to another based solely on the withdrawal or injection of fluids from the receptacle 22. As fluid enters the receptacle, the moveable wall 36 moves downward through the container 12, thereby increasing the volume of the sealed chamber 16. As pressure in the receptacle 22 decreases, the wall moves in the proximal direction, thereby decreasing the volume of the sealed chamber 16.

In one non-limiting embodiment, the rigid walls 38 of the fluid container 12 are made of transparent or semi-transparent material so that the moveable wall 36 is visible from the outside of the pressure equalizing device 10 and can serve as a visual indicator of how much fluid has been added or removed from a receptacle 22.

The moveable wall 36 may be formed from a rigid or flexible material. For example, the moveable wall 36 can be constructed of one or more materials that are fluid impermeable (i.e., that does not permit the passage of a fluid), such as silicone, a thermoplastic polyester elastomer, (TPE), or rubber. The moveable wall 36 must create a seal between the sealed chamber 16 and the open chamber 14 for preventing vented gas from escaping through the open chamber 14 into ambient air. The moveable wall 36 may further include a fluid impermeable coating 40 and/or an outer annular seal 42, such as a ring-shaped seal for abutting the inner wall of the container 12.

In a further non-limiting embodiment, the moveable wall 36 is an annular member defining a central opening 46. The fluid transfer member 24 is inserted through the central opening 46. In this case, the moveable wall 36 may also include an inner annular seal 44 disposed between the central opening 46 and the fluid transfer member 24 creating a seal therebetween.

In a further non-limiting embodiment, the sealed chamber 16 is at least partly filled with sterilized air, which enters the chamber 16 through a fluid inlet (not shown), such as a valve, in communication with ambient air. A filter may be disposed within the inlet to sterilize the incoming air. The filter may be removable or integrated with the inlet. The filter may be any suitable commercially available filter, such as a particulate air filter having a pore size of 0.2 µm or smaller, a carbon filter, or a hydrophobic filter which permits gas to pass but prevents liquid, gas-borne particles, micro-organisms, and aerosols from passing therethrough. As described above, "sterilized air" refers to fluids that have been subjected to a sterilization method to remove viable micro-organisms using methods approved by the relevant regulatory authority. The open chamber 14 may also be provided with fluid opening defined by the container 12 to further ensure that the moveable wall 36 is free to move within the container 12.

Figure 2:
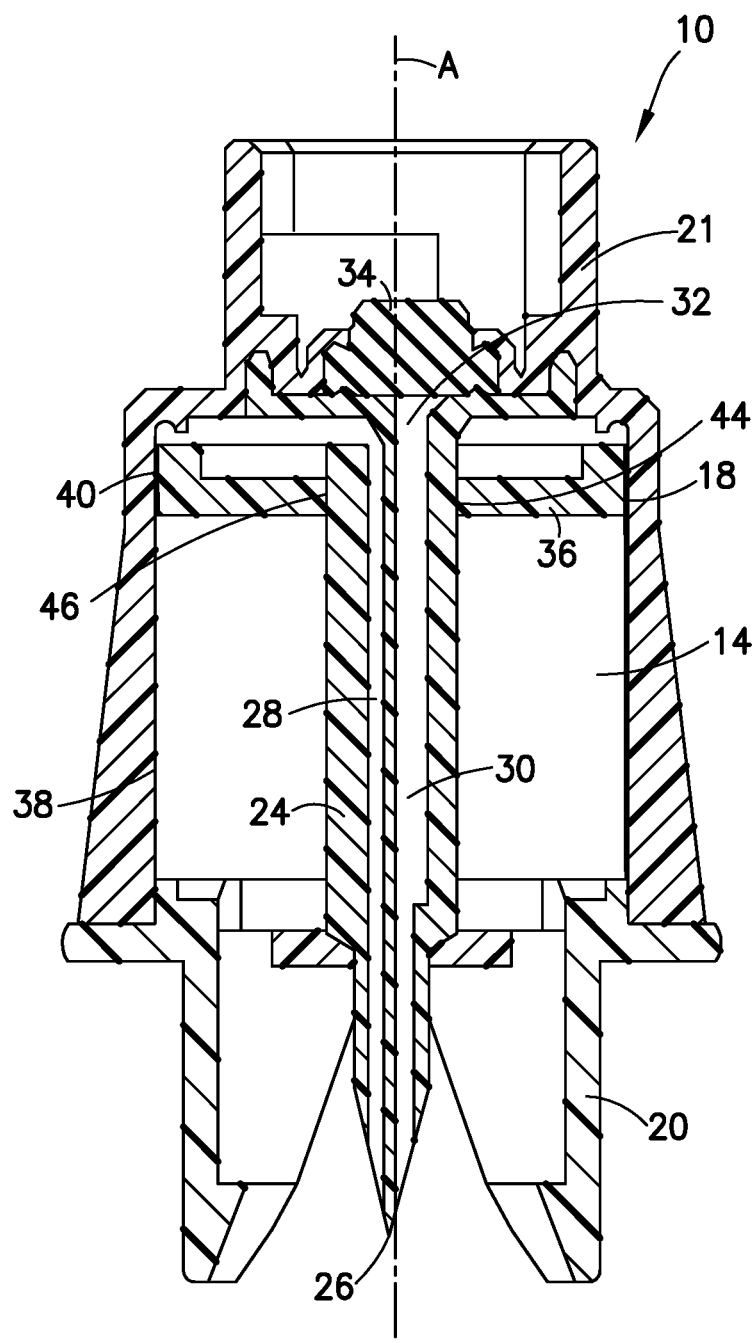
FIG. 2 is a cross sectional view of the pressure equalizing device of FIG. 1, according to an embodiment of the present invention.
Figure 3:
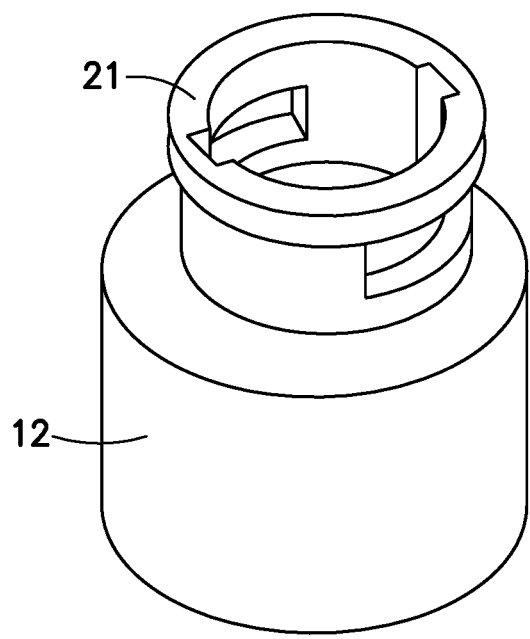
FIG. 3 is a perspective view of a container of the pressure equalizing device of FIG. 1, according to an embodiment of the present invention.
Figure 5:
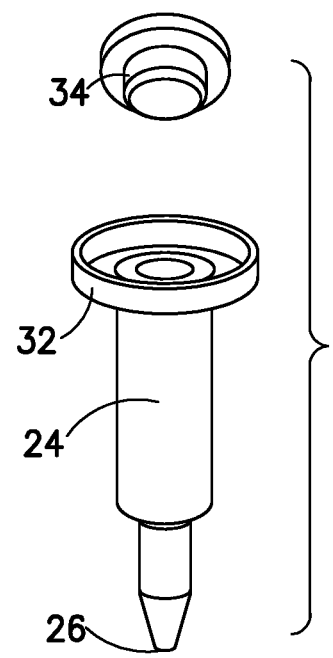
FIG. 5 is an exploded perspective view of the needle and pierceable membrane of the pressure equalizing device of FIG. 1, according to an embodiment of the present invention.
Figure 4:
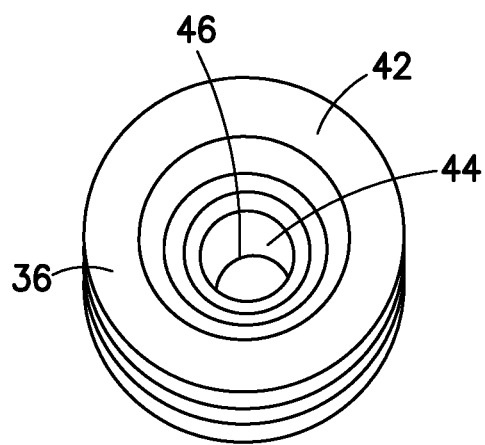
FIG. 4 is a perspective view of a moveable wall of the pressure equalizing device of FIG. 1, according to an embodiment of the present invention.
Figure 6:
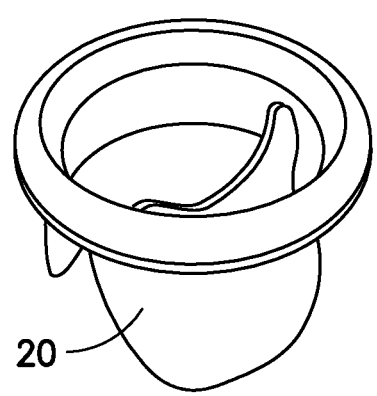
FIG. 6 is a perspective view of the receptacle connector of the pressure equalizing device of FIG. 1, according to an embodiment of the present invention.

As is depicted in FIGS. 1 and 2, the pressure equalizing device 10 has a substantially cylindrical cross-section A. Alternatively, at least one part of a pressure equalizing device 10 may have a substantially polygonal cross-section. Including a polygonal or other non-circular cross-section prevents the device 10 and/or attached receptacle 22 from rolling on a flat or sloped surface.

Having described an embodiment of a pressure equalizing device 10, an assembly 100 for drug reconstitution is now described. With reference to FIG. 7 and in one non-limiting embodiment, the assembly includes the pressure equalizing device 10, receptacle 22, and fluid container 110. The fluid container 110, such as a syringe, is used to introduce a solvent or drug component to the receptacle 22, through the access channel 30 of the pressure equalizing device 10. The fluid container 110 may further include a syringe adapter or injector 111 connected between the syringe 110 and pressure equalizing device 10, as shown in FIG. 7. The fluid container 110 should include a needle cannula, needleless access port, nozzle, or other access arrangement for establishing a fluid connection between the fluid container 110 and the access channel 30 of the device 10. The fluid container 110 may be at least partially formed from a thermoplastic material, such as polyethylene or polypropylene, acrylonitrile butadiene styrene (ABS), polycarbonate, polyester, or any other suitable material. As shown in FIG. 7, the longitudinal axis A of the pressure equalizing device 10 is aligned with the longitudinal axis B of the receptacle 22 and with the longitudinal axis C of the fluid container 110, thereby forming a linear assembly.

In one non-limiting embodiment of the assembly and as is shown in FIG. 7, the pressure equalizing device 10 may be integrally formed with at least one component of the receptacle 22. For example, the pressure equalizing device 10 may be integrally formed with a cap, neck, seal, or pierceable septum of the receptacle 22.

Figure 9:
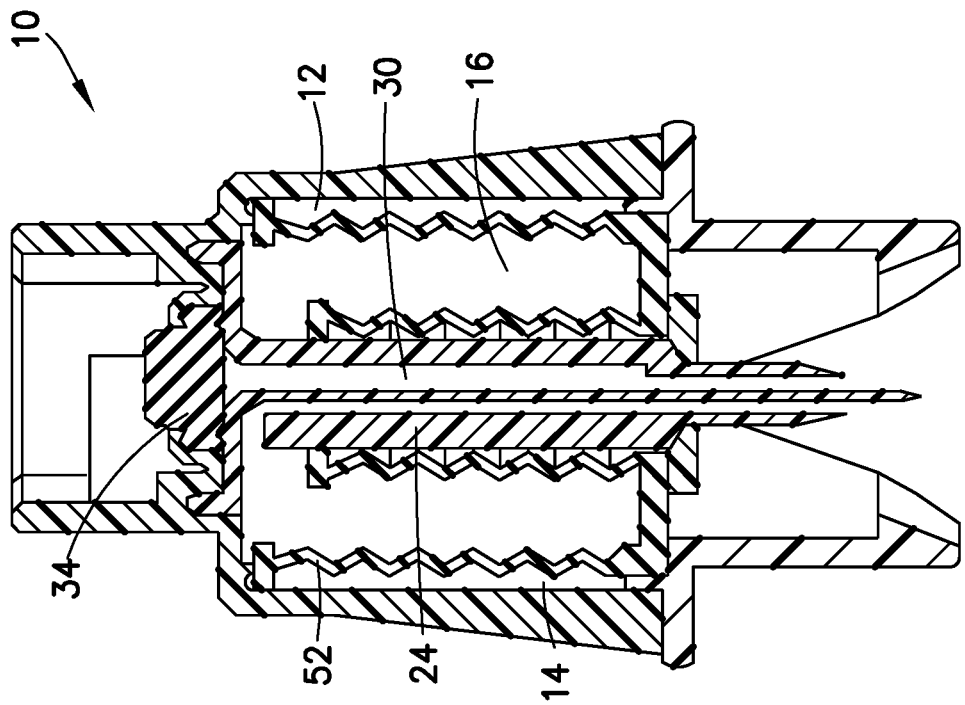
FIG. 9 is a cross sectional view of a pressure equalization device according to a further embodiment of the present invention.
Figure 8:
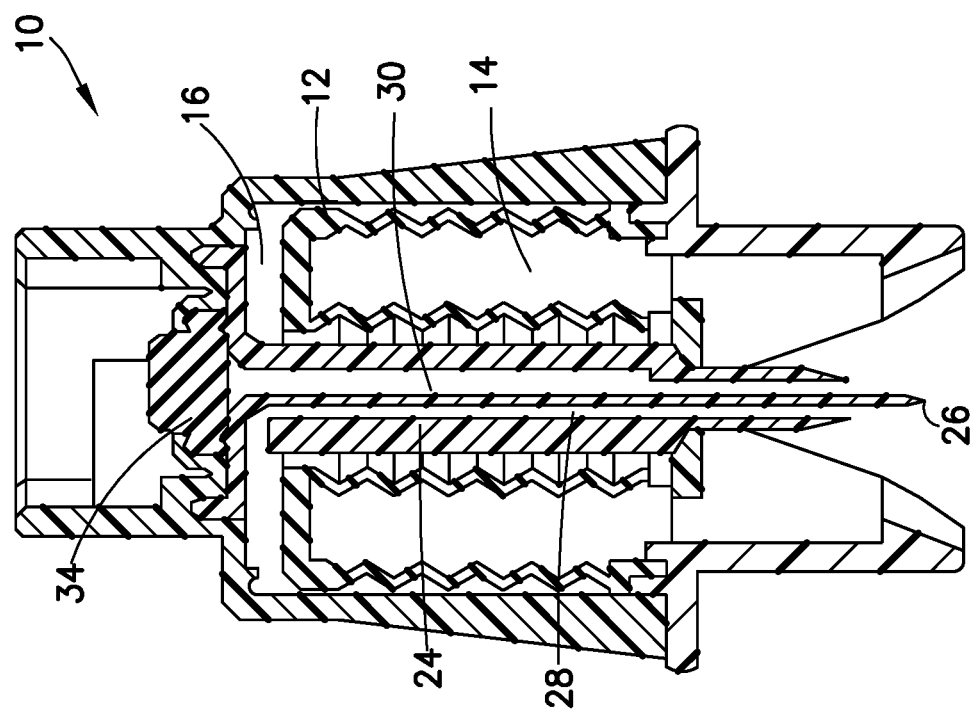
FIG. 8 is a cross sectional view of a pressure equalizing device according to a further embodiment of the present invention.

With reference now to FIGS. 8 and 9 and in a further non-limiting embodiment of the pressure equalizing device 10, the container 12 includes a deformable bellows 52 disposed within the container 12. The bellows 52 is disposed between a sealed chamber 16 and an open chamber 14 in the same way that the moveable wall 36 maintained separation between the chambers 14, 16 in the previously described embodiments. The bellows 52 is formed from a flexible material such as rubber or plastic that expands or contracts in response to a change in volume of the sealed chamber 16. An inflatable balloon may also be used in place of the bellows 52.

With particular reference to FIG. 8, the bellows 52 are attached to a distal portion of the container 12. In this configuration, as fluid from the receptacle 22 enters the sealed chamber 16 through the venting channel 28, the fluid flows around the bellows 52 causing the bellows 52 to contract. As the bellows 52 contracts, the volume of the sealed chamber 16 increases.

Alternatively, and with reference to FIG. 9, the bellows 52 are attached to a proximal end of the container 12. In this configuration, the bellows 52 expands as fluid from the receptacle 22 enters the sealed chamber 16 through the venting channel 28. The volume of the sealed chamber 16 expands, as the volume of the bellows 52 expands.

Figure 10A:
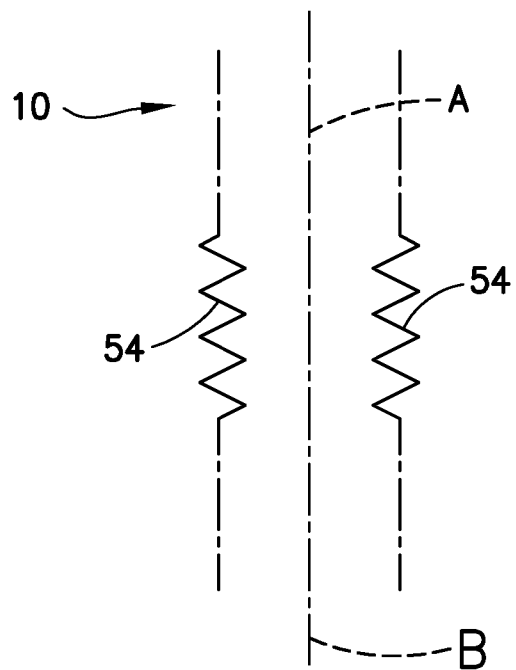
FIG. 10A is a schematic representation of a pressure equalizing device according to a further embodiment of the present invention.
Figure 10B:
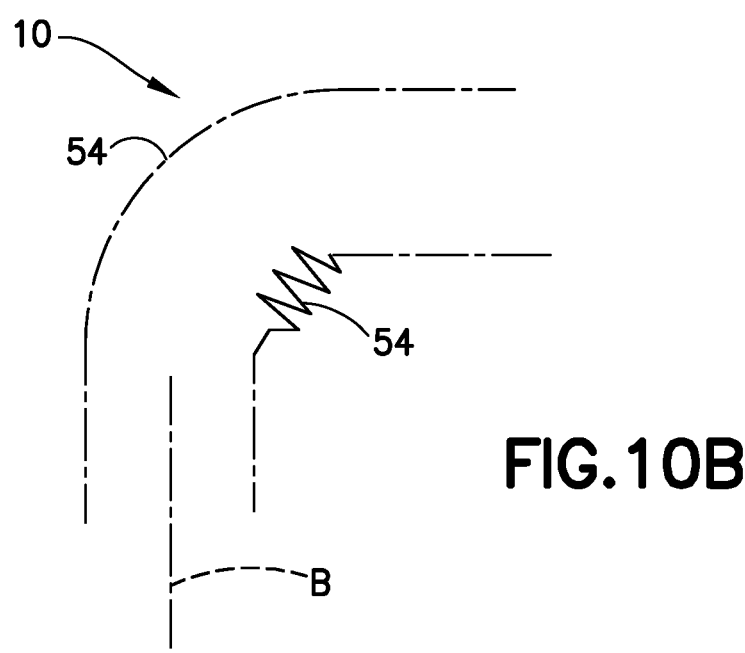
FIG. 10B is a schematic representation of the pressure equalizing device of FIG. 10A, bent to about 90 degrees, according to an embodiment of the present invention.

With reference to FIGS. 10A and 10B and according to a further non-limiting embodiment of the invention, the pressure equalizing device 10 further includes one or more flexible joints 54 connected to or integrally formed with other structural portions of the pressure equalizing device 10. For example, the flexible joints 54 may be included with the rigid walls 38 of the container and/or the fluid transfer member 24, to permit bending of the container 12 and fluid transfer member 24. The flexible joints 54 may be formed from any flexible material, including plastic or rubber, which can be easily bent without breaking, and which maintains a bent orientation until straightened by a user. If the flexible joints 54 are integrally formed with the container 12 or fluid transfer member 24, then the flexible joints 54 will be formed from the same material as the container 12 and/or member 24. For example, the flexible joints 54 may be formed from a thermoplastic material, including polyethylene or polypropylene, acrylonitrile butadiene styrene (ABS), polycarbonate, polyester, or any other suitable material. In use, a user can grasp the device 10 and/or receptacle 22 and bend the flexible joints 54 to change the orientation of the device 10 relative to the longitudinal axis (B) of the receptacle.

It is noted that once the one or more flexible joints 54 are bent, the longitudinal axis A of the pressure equalizing device is no longer parallel with the longitudinal axis B of the receptacle 22. As shown in FIG. 10A, when the flexible joints 54 are in the straight or unbiased orientation, the longitudinal axis A of the device 10 is parallel with the longitudinal axis B of the receptacle 22. However, as shown in FIG. 10B, when the flexible joints 54 are in the bent orientation, axis A and axis B are not parallel. In one non-limiting embodiment, the flexible joint 54 is configured to bend up to about 90 degrees, thereby permitting at least a part of the pressure equalizing device 10 to be bent 90 degrees or more relative to the longitudinal axis B of the receptacle 22. By bending at least a portion of the pressure equalizing device 10 so that longitudinal axis A is not parallel to longitudinal axis B of the receptacle 22, the device 10 and receptacle 22 can be placed on a flat or sloped surface. Specifically, when in the bent orientation, it is less likely that the device 10 and receptacle 22 will roll along the surface, possibly damaging the device 10 and/or substances contained therein.

While specific embodiments of the device, assembly, and method have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A pressure equalizing device comprising:
   a container for attachment to a receptacle, to permit pressure equalization between the container and the receptacle, the container comprising a bellows defining a first chamber and a second chamber within the container;
   a fluid transfer member connected to and extending from the container; and
   a vent channel defined by the fluid transfer member, the vent channel extending between the first chamber and a distal opening of the vent channel and the second chamber is disposed between the bellows and a distal end of the vent channel,
   wherein when the receptacle is connected to the pressure equalizing device, the vent channel establishes direct fluid communication between the first chamber and the receptacle,
   wherein a longitudinal axis of the pressure equalizing device is configured to be aligned with or parallel to a longitudinal axis of the receptacle when the pressure equalizing device is attached to the receptacle, and
   wherein expansion or contraction of the bellows modifies a volume of the first chamber and a volume of the second chamber.

2. The pressure equalizing device of claim 1, wherein the bellows are attached to a distal portion of the container.

3. The pressure equalizing device of claim 1, wherein the bellows are attached to a proximal portion of the container.

4. The pressure equalizing device of claim 1, wherein a longitudinal axis of the fluid transfer member is aligned with the longitudinal axis of the pressure equalizing device.

5. The pressure equalizing device of claim 1, wherein the first chamber is sealed from the surrounding atmosphere.

6. The pressure equalizing device of claim 1, wherein a cross-sectional view of the container is substantially circular.

7. The pressure equalizing device of claim 1, wherein the container is at least partly filled with a sterilized fluid.

8. The pressure equalizing device of claim 1, wherein the first chamber of the container is filled with filtered ambient air.

9. The pressure equalizing device of claim 1, further comprising a receptacle connector for removeably affixing the pressure equalizing device to the receptacle.

10. The pressure equalizing device of claim 1, wherein the fluid transfer member defines an access channel extending from an access port located at a proximal end of the fluid transfer member, and the access port is configured to connect to a fluid injector.

11. The pressure equalizing device of claim 10, further comprising a pierceable membrane connected to the access port of the fluid transfer member.

12. The pressure equalizing device of claim 10, further comprising a connector for attaching the fluid injector to the pressure equalizing device and for establishing fluid connection between the fluid injector and the receptacle through the access channel.

13. An assembly for reconstitution of a substance comprising:
    a fluid injector comprising a fluid reservoir and having a longitudinal axis;
    a receptacle defining an interior volume and having a longitudinal axis; and
    a pressure equalizing device connected between the fluid injector and the receptacle having a longitudinal axis, the pressure equalizing device comprising:
        a container for attachment to the receptacle, to permit pressure equalization between the container and the receptacle, the container comprising a bellows defining a first chamber and a second chamber within the container;
        a fluid transfer member connected to and extending from the container; and
        a vent channel defined by the fluid transfer member, the vent channel extending between the first chamber and a distal opening of the vent channel and the second chamber is disposed between the bellows and a distal end of the vent channel,
    wherein when the receptacle is connected to the pressure equalizing device, the vent channel establishes direct fluid communication between the first chamber and the receptacle,
    wherein the longitudinal axis of the pressure equalizing device, the longitudinal axis of the receptacle, and the longitudinal axis of the fluid injector are aligned with or parallel to each other, and
    wherein expansion or contraction of the bellows modifies a volume of the first chamber and a volume of the second chamber.

* * * * *